US012151892B2

(12) United States Patent
Bianco et al.

(10) Patent No.: US 12,151,892 B2
(45) Date of Patent: Nov. 26, 2024

(54) AUTOMATED MULTI-STOREY WAREHOUSE

(71) Applicant: ICAM S.R.L., Putignano (IT)

(72) Inventors: Roberto Bianco, Putignano (IT); Leonardo Antonio Veccaro, Alberobello (IT); Roberto Impedovo, Castellana Grotte (IT)

(73) Assignee: ICAM S.R.L., Putignano (IT)

( * ) Notice: Subject to any disclaimer, the term of this patent is extended or adjusted under 35 U.S.C. 154(b) by 648 days.

(21) Appl. No.: 17/383,905

(22) Filed: Jul. 23, 2021

(65) Prior Publication Data

US 2022/0033187 A1    Feb. 3, 2022

(30) Foreign Application Priority Data

Jul. 29, 2020   (IT) ........................ 102020000018490

(51) Int. Cl.
*B65G 1/137*  (2006.01)
*E04H 5/02*  (2006.01)

(52) U.S. Cl.
CPC ............. *B65G 1/1375* (2013.01); *E04H 5/02* (2013.01)

(58) Field of Classification Search
CPC ............................... B65G 1/1375; E04H 5/02
See application file for complete search history.

(56) References Cited

U.S. PATENT DOCUMENTS

| 2004/0193311 | A1* | 9/2004 | Winkler | B65G 1/1378 700/216 |
| 2015/0033674 | A1 | 11/2015 | Ahammer et al. | |
| 2018/0237220 | A1 | 8/2018 | Yamagishi | |
| 2022/0033187 | A1* | 2/2022 | Bianco | B65G 1/1375 |

FOREIGN PATENT DOCUMENTS

| EP | 2 949 604 | 12/2015 |
| EP | 3 354 598 | 8/2018 |

* cited by examiner

*Primary Examiner* — Kyle O Logan
(74) *Attorney, Agent, or Firm* — Leason Ellis LLP (57) ABSTRACT

An automated multi-storey warehouse is provided with a first and at least a second module, each having: at least one pick-up/deposit station to allow an operator to retrieve and/or deposit products relative to trays arranged in the station; and a transfer lift assembly having a lift shaft and a pick-up/deposit device, which is movable in the lift shaft and is configured so as to be able to horizontally translate the trays; the second module is a storage module having at least one storage column directly alongside the lift shaft and capable of accommodating respective trays; the pick-up/ deposit station of the first module is arranged at a first level, whereas the storage column of the second module is arranged at a second level and is completely above or below the first level; the warehouse has an exchange station, which has at least one place for the temporary depositing of a tray and is accessible by both the pick-up/deposit devices of the first and the second module.

10 Claims, 6 Drawing Sheets

Figure 6

AUTOMATED MULTI-STOREY WAREHOUSE

CROSS-REFERENCE TO RELATED APPLICATIONS

This Patent Application claims priority from Italian Patent Application No. 102020000018490 filed on Jul. 29, 2020, the entire disclosure of which is incorporated herein by reference.

TECHNICAL FIELD

The invention relates to an automated multi-storey warehouse, which entails an arrangement or layout of a plurality of modules and storage levels.

BACKGROUND ART

As it is known, automated warehouses are provided with storing areas having a plurality of places housing respective containers or trays, which normally have a rectangular shape, in top plan view, and are generally provided with compartments aimed at containing the stored objects. These warehouses also have a pick-up/deposit station or bay, to which users have access to store and/or retrieve objects. The trays are transferred between the places of the warehouse and the pick-up/deposit bay by means of suitable motor-driven transfer mechanisms, which are controlled by a control unit in an automated manner. In some cases, these transfer mechanisms comprise a lift, which carries a pick-up/deposit device, which is capable of horizontally transferring a tray between the lift and the pick-up/deposit bay or between the lift and the place assigned to the tray in the store.

In this industry, automated warehouses need to be installed in buildings and, more in general, building structures which are already being used for other purposes and have to be recovered or re-used.

Some of these structures are provided with narrow spaces in plan view (dedicated, for example, to freight elevators or lifts) and have a relatively great height. Examples of these building structures are silos, skyscrapers, very tall buildings and, in general, very tall structures that need to be equipped with a system to store and transfer products between all storeys. In these cases, during renovations, using the shafts of freight elevators/lifts to integrate one single vertical automated warehouse taking up the entire height can be complicated due to the technical limitations of currently available vertical automated warehouses, which cannot exceed a height of 15-20 metres.

Therefore, known solutions are not suited to be installed and/or cannot ensure enough flexibility in the handling of the storage in this type of building structures.

In particular, at least two storage modules are needed, with a need to share articles and stocks.

DISCLOSURE OF INVENTION

The object of the invention is to provide an automated multi-storey warehouse, which fulfils the needs discussed above in a simple and economic fashion.

According to the invention, there is provided an automated multi-storey warehouse as claimed in claim 1.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

Figure 1:
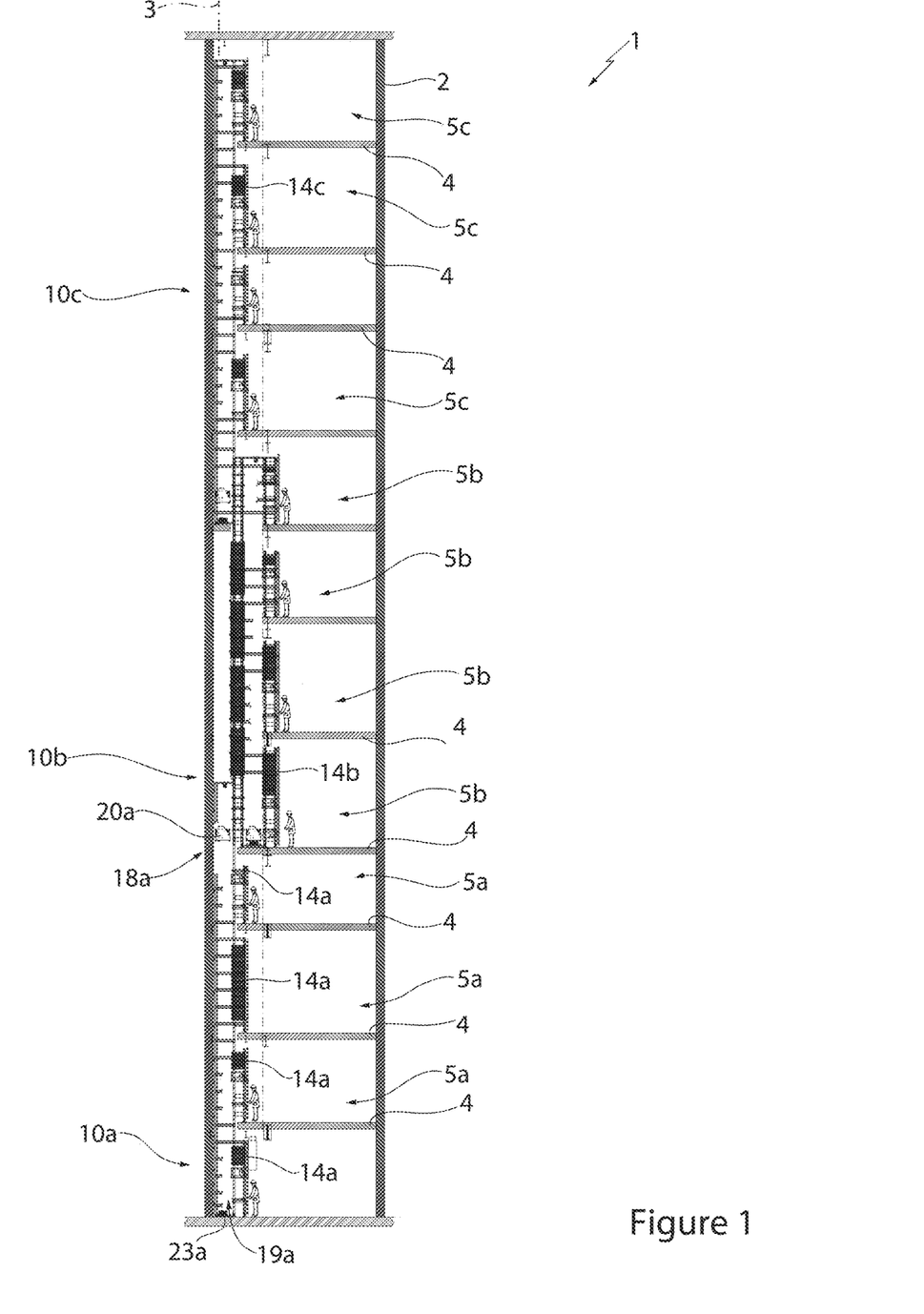
FIG. 1 is a schematic side view of a preferred embodiment of the automated multi-storey warehouse according to the invention.

In FIG. 1, reference number 1 indicates a vertical automated warehouse installed in a building structure 2, which has a relatively small plan view and a relatively large height, hence a relatively narrow and elongated shape along a vertical direction 3. A series of floors 4 vertically divide the warehouse 1 into a plurality of storage levels or storeys, which are aligned with one another along the direction 3 and are identified by reference numbers 5a,5b,5c. Therefore, each one of said storage levels is separate from the other ones, namely is completely arranged above and/or under the other levels. The floors 4 can be walked on by operators (who can reach the storeys through lifts or stairs, which are not shown herein and are arranged on the inside or on the outside of the building structure 2) and can be part of the building structure 2 where the warehouse 1 is installed from the very beginning or can be manufactured and added to the building structure 2 during the installation of the warehouse 1, in case they are not present since the beginning.

Figure 3:
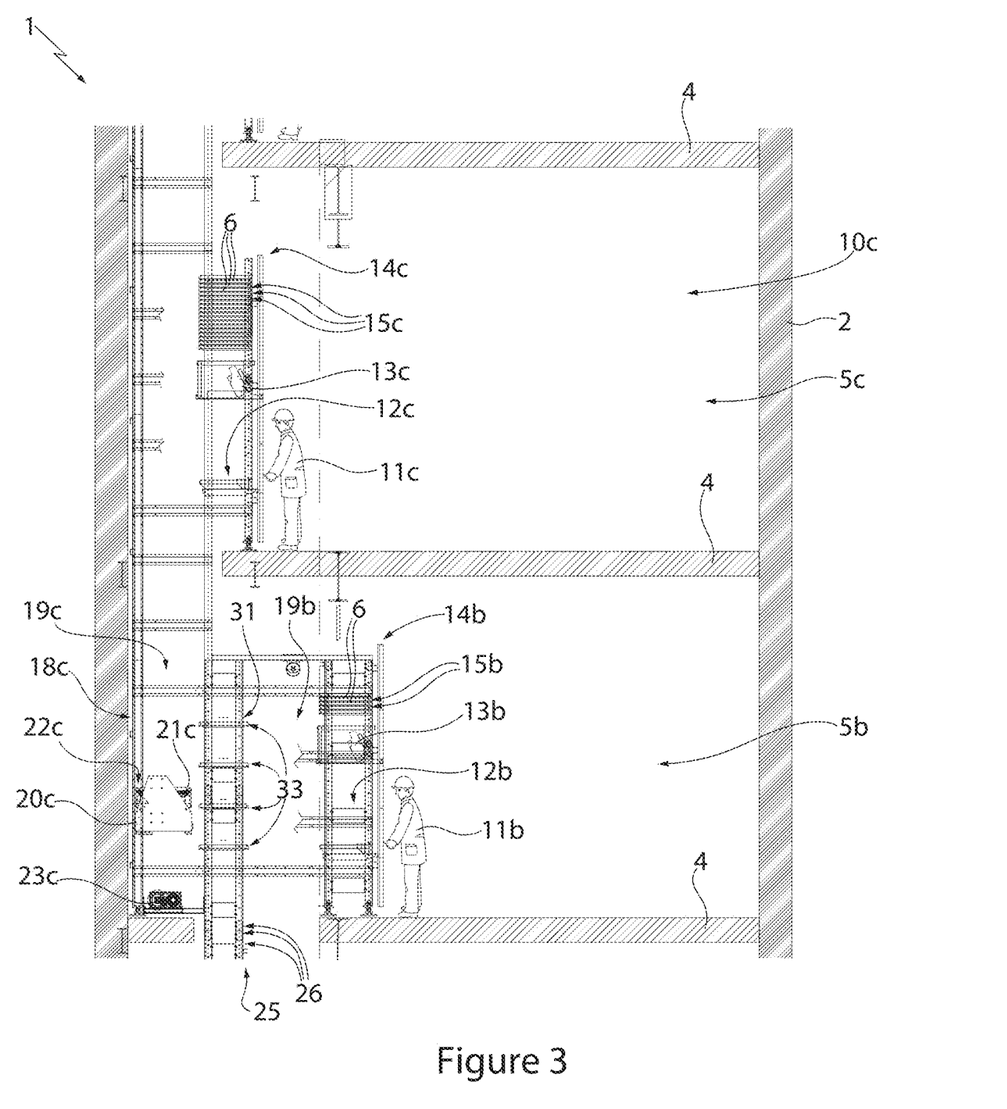

With reference to FIG. 3, the warehouse 1 comprises a plurality of loading units 6 defined by trays, where different products can be stored. Each loading unit 6, in particular, has a base with a rectangular perimeter (defined by a pair of long sides parallel to one another and by a pair of short sides orthogonal to the long sides), but it could also have a square shape; each loading unit 6 comprises a side board, which projects upwards from the perimeter of the aforesaid base, with possible dividing or inner walls to divide the total volume of the loading unit 6 into sectors or compartments. Preferably, the loading units 6 all have the same shape and the same outer geometry, but they can have a different separation of the inner space.

According to FIG. 1, the warehouse 1 comprises at least two storage modules, which are arranged in series to one another along the direction 3. In the particular embodiment shown herein, the warehouse 1 comprises three storage modules, identified by reference numbers 10a, 10b and 10c. The storage levels 5a are part of the module 10a, the storage levels 5b are part of the module 10b and the storage levels 5c are part of the module 10c. The quantity of storage levels 5a,5b,5c for each module 10a,10b,10c could be different from the one shown herein and it could even amount to one.

Therefore, the products of the storage modules 10a, 10b and 10c are stored in the respective storage levels 5a, 5b and 5c by means of the aforesaid loading units 6 and are handled in such a way that the storage levels 5a, 5b and 5c can be considered as independent from one another, namely like in an autonomous warehouse. At the same time, as explained more in detail below, the loading units 6 can be transferred between the storage modules 10a, 10b, 10c in order to make the handling of the products more flexible.

Figure 4:
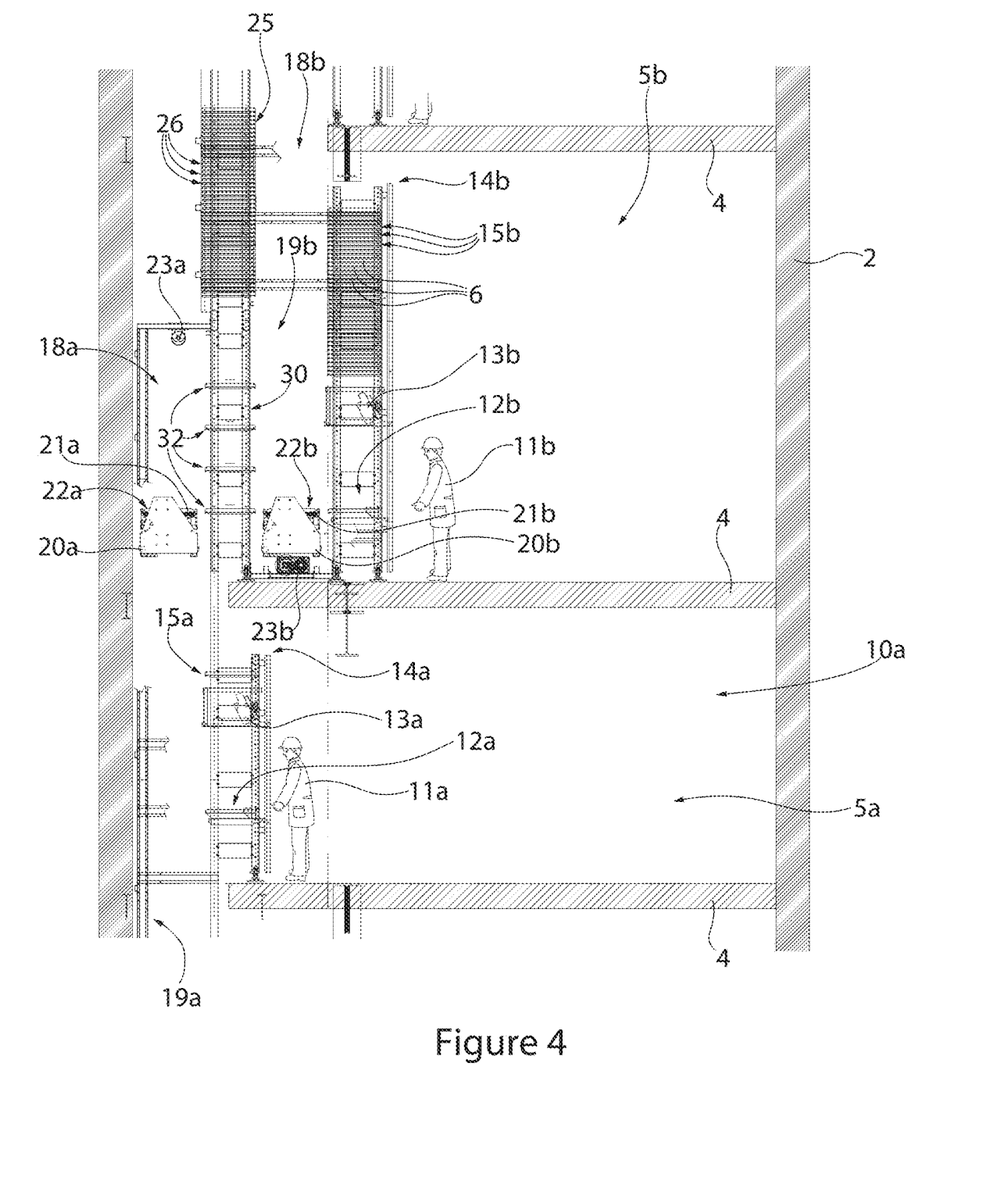

The following description relates to the components and functions of the storage module 10a, which is partially shown in FIG. 4. As to the other storage modules 10b and 10c, they have corresponding components and functions, identified by the same reference number and by a different reference letter following said number (namely, "b" or "c", respectively, instead of "a").

As mentioned above, the storage module 10a comprises at least one storage level 5a (and it preferably comprises a plurality of storage levels 5a stacked on top of one another along the direction 3, as shown in FIG. 1). The storage level 5a can be accessed by an operator 11a and has a pick-up/deposit bay 12a, which defines an access point to access the storage module 10a, since it allows operators 11a to retrieve articles from the compartments of the loading units 6 and to deposit articles in said compartments. The pick-up/deposit station 12a is provided with control means and/or assistance systems, generally indicated by 13a, to correctly retrieve the products from the loading units 6 and to deposit the products in the right compartments.

In particular, each one of the storage levels 5a comprises one pick-up/deposit station 12a at most (namely, it comprises one station or none).

Each one of the storage levels 5a comprises a respective storage column 14a having a series of places 15a, which are vertically aligned with one another and are designed to be engaged by respective loading units 6. Each place 15a is configured so as to vertically support a corresponding loading unit 6, giving the latter the chance to be transferred from and to the place 15a in a horizontal direction, in order to retrieve and deposit the loading unit 6 itself. The structure of the storage columns 14a to support the loading units 6 and to allow them to be transferred in a horizontal direction from and to the respective places 15a is defined by section bar elements and/or guide elements in ways that are known to a person skilled in the at, which is why it is not described and shown in the invention.

Preferably, with reference to FIG. 1, the storage columns 14a of the different storage levels 5a are vertically aligned with one another. In particular, for each storage level 5a, there is one singe storage column 14a (this feature, however, is not present in the storage module 10b, as better described below).

With reference to FIG. 4, again, the storage module 10a has a transfer lift assembly 18a comprising:
- a lift shaft 19a, which vertically extends along all storage levels 5a of the storage module 10a, in a position directly alongside the storage columns 14a;
- a lift 20a vertically movable in the lift shaft 19a; and
- a motor-driven pick-up/deposit device 21a, which is supported by the lift 20a so as to travel with the latter and can be operated so as to horizontally translate at least one loading unit 6 between a place 22a on the lift 20a and any one of the places 15a (when the device 21a is horizontally alongside, namely when it is substantially arranged at the same height in order to retrieve and/or release the loading unit 6 arranged in the place 15a);
- a (partially shown) motor-driven operating device 23a, which can be defined, for example, by a toothed belt transmission operated by an electric motor, is coupled to the lift 20a in a known manner not shown herein and is controlled by a (not shown) control unit, so as to lift and lower the lift 20a and cause the pick-up/deposit device 21a to reach the desired height, in a position alongside any one of the places 15a.

Therefore, the pick-up/deposit device 21a of the assembly 18a evidently has access to all loading units 6 stored in the places 15a of the entire storage module 10a.

As far as the configuration and the constructive details of the device 21a are concerned, manufacturers can choose a solution from the ones already available in the state of the art. In particular, they should choose a solution that is capable of horizontally translating the loading unit 6 from and to the place 22a through one or more sides of the lift shaft 19a.

Preferably, in each one of the storage modules 10a,10b, 10c there is one single transfer lift assembly 18a,18b,18c.

Preferably, each pick-up/deposit station 12a is integrated in the corresponding storage column 14a, namely is vertically aligned with the places 15a of said storage column 14a. In other words, the pick-up/deposit station 12a does not horizontally project relative to the outline of the storage column 14a, so that it can also be accessed by the device 21a of the assembly 18a. Therefore, the pick-up/deposit station 12a does not require a dedicated transfer assembly, but directly exploits the assembly 18a for the transfer of the loading unit 6 between the pick-up/deposit station 12a itself and its place 15a available in the storage module 10a.

FIG. 3 shows one of the storage levels 5c of the storage module 10c, where the same components described above for the storage module 10a are visible.

Figure 2:
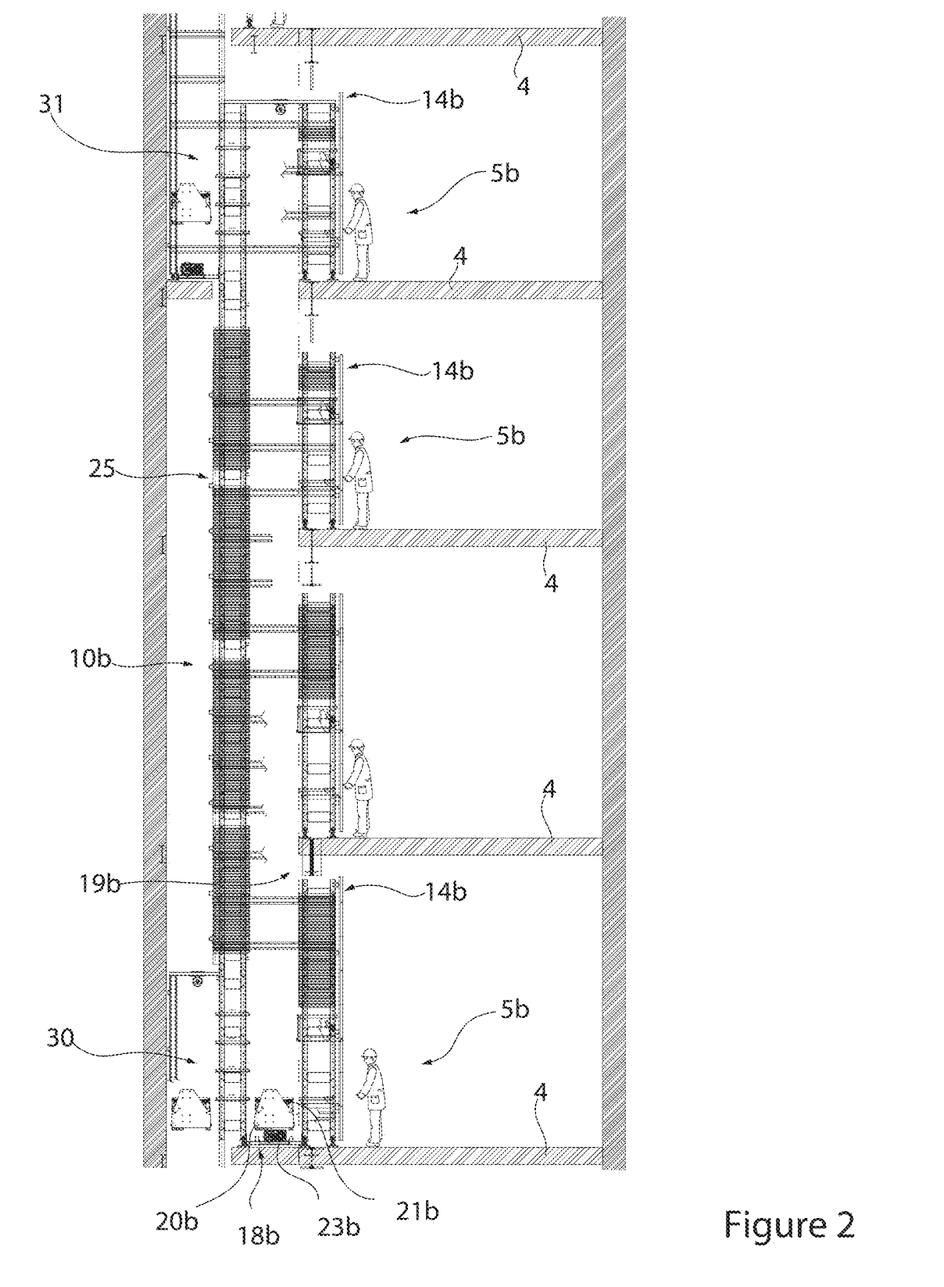
FIGS. 2 to 4 show, on a larger scale, respective details of FIG. 1.

With reference to FIGS. 2 to 4, the storage module 10b differs from the storage modules 10a and 10c in that it has an additional storage column 25, which is parallel to the columns 14b, is provided with respective places 26 to accommodate the loading units 6, is without pick-up/deposit stations and is arranged in a position directly alongside the lift shaft 19b, so that it can horizontally translate the loading units 6 from and to the places 26 through the device 21b, which transfers the loading units 6 from and to the places 15b of the columns 14b. In particular, the lift shaft 19b is horizontally aligned with and arranged between the storage column 25 and the row of storage columns 14b.

Preferably, the column 25 extends through the floors 4 and, therefore, extends with continuity, preferably along all storage levels 5b of the storage module 10b.

In particular, the lift shafts 19a and 19c are vertically aligned with one another. More in particular, the space present between the upper end of the lift shaft 19a and the lower end of the lift shaft 19c is left empty or unused.

With reference to FIGS. 3 and 4, according to an aspect of the invention, a loading unit 6 can be transferred between the storage modules 10a, 10b and 10c through exchange stations 30 and 31, which have respective spaces 32 and 33 for the temporary depositing of the loading units 6. According to FIG. 4, each place 32 of the exchange station 30 is accessible both through the device 21a of the assembly 18a and through the device 21b of the assembly 18b. Similarly, according to FIG. 3, each place 33 of the exchange station 31 is accessible both through the device 21b of the assembly 18b and through the device 21c of the assembly 18c.

Preferably, the exchange station 30 is arranged on the last storey or level (from the bottom to the top) of the storage levels 5a or is arranged on the first storey or level of the storage levels 5b. Similarly, the exchange station 31 is arranged on the last storey or level of the storage levels 5b or is arranged on the first storey or level of the storage levels 5c.

In the particular example shown herein, the exchange stations 30 and 31 are arranged on the first and on the last storey or level, respectively, of the storage module 10b. Hence, the lift shaft 19a extends up to the first storey or level of the storage module 10b, where, therefore, there are both lift shafts 19a and 19b (FIG. 4). Similarly, the lift shaft 19c extends up to the first storey or level of the storage module 10b, where, therefore, there are both lift shafts 19c and 19b (FIG. 3).

Preferably, the exchange stations 30 and 31 are integrated in the storage column 25. In other words, the places 32 and 33 are vertically aligned with the places 26 and, basically, can be identical to the places 26 from a constructive point of view.

The control unit mentioned above can be shared by all storage modules 10a, 10b and 10c or there can be different control units, anyway communicating with one another. Each control unit is configured, through suitable programs, to handle and store products and, hence, carry out the following functions: controlling the assemblies 18a, 18b and 18c in a coordinated manner and, thus, transferring the loading units 6; choosing the loading units 6 to be transferred; giving instructions or other information to operators 11a, 11b, 11c (for example through the systems 13a, 13b, 13c); monitoring the state of stocks; etc.

As to the transfer of a loading unit 6 between two storage modules that are adjacent to one another along the direction 3, an operating sequence of operations will now be described in a merely explanatory case, in which a loading unit 6 is transferred starting from a place 15a of its in the storage module 10a to a place 15b (or 26) of the storage module 10b (FIG. 4):

the lift 20a is lifted or lowered so as to have it stop in a position horizontally alongside the place 15a, namely substantially at the same height;

the device 21a is operated so as to retrieve the loading unit 6 and horizontally translate it from the place 15a to the place 22a on the lift 20a;

the lift 20a is lifted up to the exchange station 30 so as to stop in a position horizontally alongside a place 32;

the device 21a is operated so as to horizontally translate the loading unit 6 from the place 22a to the place 32 and release the loading unit in said place 32 (after the release, the assembly 18a can be controlled so as to fulfil another task);

the lift 20a is lowered up to the exchange station 30 (if it is not already there) so as to stop in a position horizontally alongside the place 32, namely substantially at the same height;

the device 21b is operated so as to retrieve the loading unit 6 and horizontally translate it from the place 32 to the place 22b on the lift 20b;

the elevator 20b is lifted so as to stop in a position horizontally alongside or aligned with the place 15b or 26, which was defined as destination of the loading unit 6;

the device 21b is operated so as to horizontally translate the loading unit 6 from the place 22b to the destination place 15b or 26 and release the loading unit 6 there (after the release, the assembly 18b can be controlled so as to fulfil another task).

Obviously, the destination could be directly defined by the deposit/pick-up bay 12b, so as to allow an operator 11b to retrieve or deposit products, or it could be defined by one of the places 33 of the exchange station 31, so as to transfer the loading unit 6 to the storage module 10c.

The transfers taking place in an opposite direction, as well as those from and to the storage module 10c, are similar to the example that has been just described, so that the sequence of transfer phases can easily be understood with no need to actually describe them.

Figure 6:
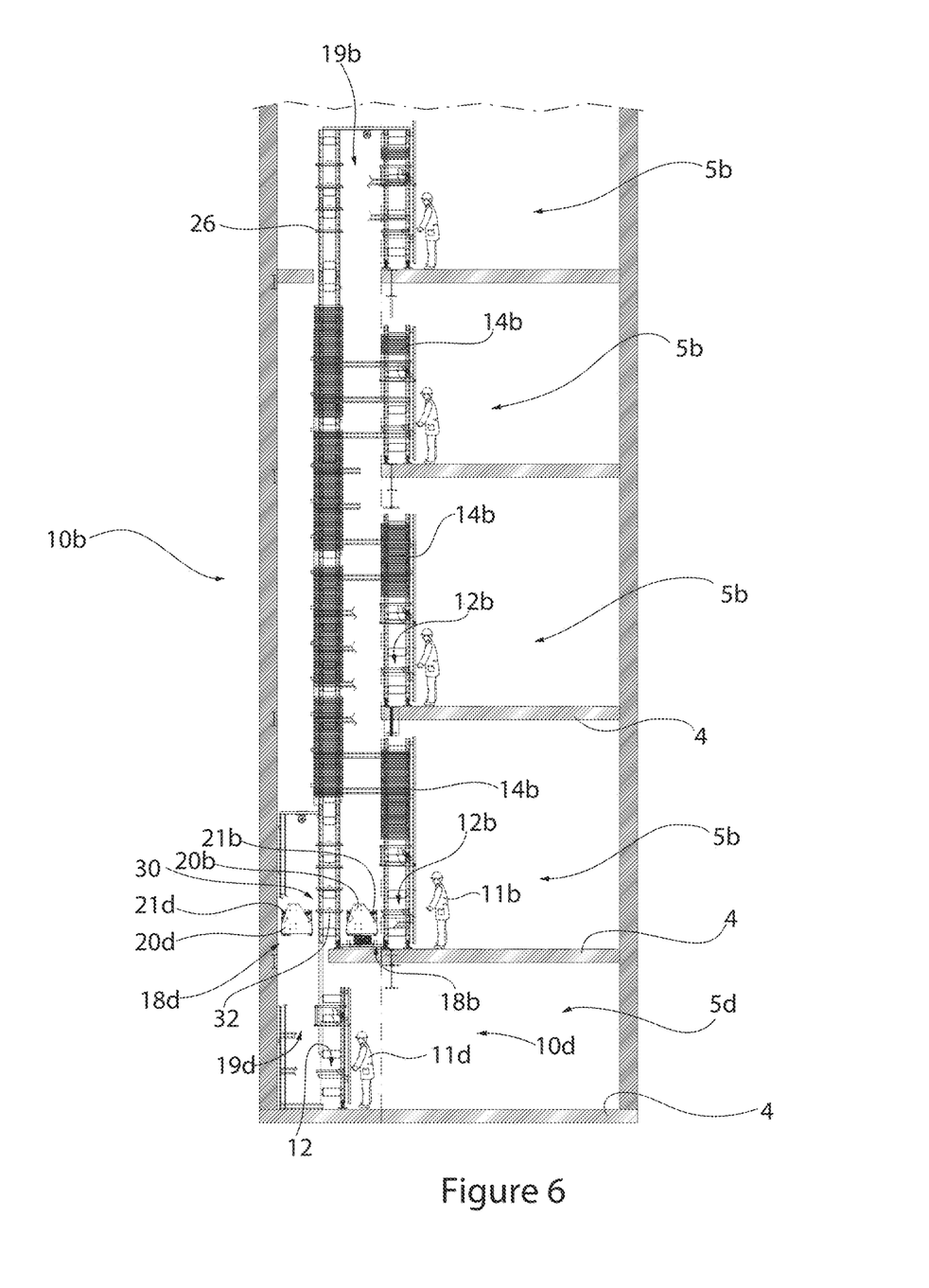
FIG. 6 is similar to FIG. 1 and shows a further embodiment of the automated multi-storey warehouse according to the invention.

In the embodiment of FIG. 6, the storage module 10c is absent and the storage module 10a is replaced by a loading/unloading module 10d exclusively having the function of letting products into/out of the warehouse 1 and, hence, differs from the storage module 10a in that it has no columns (14a) and/or places (15a) for the storage of the loading units 6. Therefore, the module 10d has reduced functionalities compared to the storage module 10a. Indeed, it only has a pick-up/deposit station 12d (similar to the bays 10a-10c), which can be accessed by an operator 11d, and a transfer lift assembly 18d (similar to the assemblies 18a-18c), whose lift shaft 19d is directly alongside the pick-up/deposit station 12d in order to be able to horizontally translate loading units 6 relative to said station. Furthermore, the assembly 18d is interfaced with at least one adjacent storage module (indicated by 10b) through an exchange station (30).

In the specific case of FIG. 6, one single storage module 10b is provided (namely, the storage module 10c is absent).

As mentioned above, the module 10d is dedicated to retrieving and depositing products by operators 11d and to transferring these products through a lift. As the same time, through the exchange station (30), products can get in/out with respect to the storage module 10b.

The station 12d is arranged at a level or storey 5d of the building structure 2 and, in the specific case of FIG. 6, is arranged on the ground storey. According to variants which are not shown herein, the station 12d could be arranged at a different storey of the warehouse 1 and/or could be arranged at a storey or level between two different storage modules.

According to a variant which is not shown herein, in case the storage module 10b is distributed on different levels on top of one another, like in the accompanying figures, the level where there is the exchange station (30) can be without pick-up/deposit station (12b), so that said level is dedicated to the sole storage and transfer from and to the adjacent module.

Owing to the above, the warehouse 1 can evidently be installed in the building structure 2 in an easy manner, even though the latter has a narrow and elongated shape, and ensures a high flexibility, thanks to the possible transfer of loading units 6 between the modules 10a, 10b, 10c, 10d, which are dislocated at different storeys or levels and are on top of one another in the building structure 2, whereas each one of said modules, considered singularly, enables the moving function (through the respective assemblies 18a, 18b, 18c and 18d) as well as the pick-up/deposit function (through the respective pick-up/deposit stations 12a, 12b, 12c and 12d). Furthermore, at least one of the modules of the warehouse 1 (for example the module 10b of the solution of FIG. 6) permits the storing of the loading cells 6 (for example in the columns 14b and/or 25).

In particular, the spaces available in the building structure can be used in an ideal manner and there can be a good management of the storage of the products, even by only providing one single storage module (10b) combined with at least one other module (10d) having the pick-up/deposit function and the transfer function, like in FIG. 6.

An important role is played by the exchange station (30 and/or 31), which is common to or shared by two modules that are adjacent to one another along the direction 3. At the same time, the way in which the lifts move the modules can be coordinated so as to optimize the overall performances of the warehouse 1 (and, in particular, so as to optimize the performances of each storage module 10a, 10b, 10c). Therefore, loading units 6 can be transferred between the different modules, which are arranged at different heights inside the building structure 2; very tall (for example 60 m tall) and complicated warehouses can be manufactured through the interconnection in height of several storage modules, each having a maximum height normally considered as standard (for example a standard height of 15 metres); storing can be handled by exploiting extremely complex areas of the building structure 2, as shown in FIG. 5, which shows—in plan view—one of the storage levels 5b; the performances of the warehouse 1 can easily be optimized, even if it has a very great height, through synchronization of the movements of the loading units 6 between the single modules 10a,10b, 10c,10d.

Finally, owing to the above, it is evident that the warehouse 1 can be subjected to changes and variations, without for this reason going beyond the scope of protection of the invention as set forth in the appended claims.

For example, the storage modules 10a and 10c could have an additional storage column as well, in a position directly alongside the lift shaft 19a, 19c.

Figure 5:
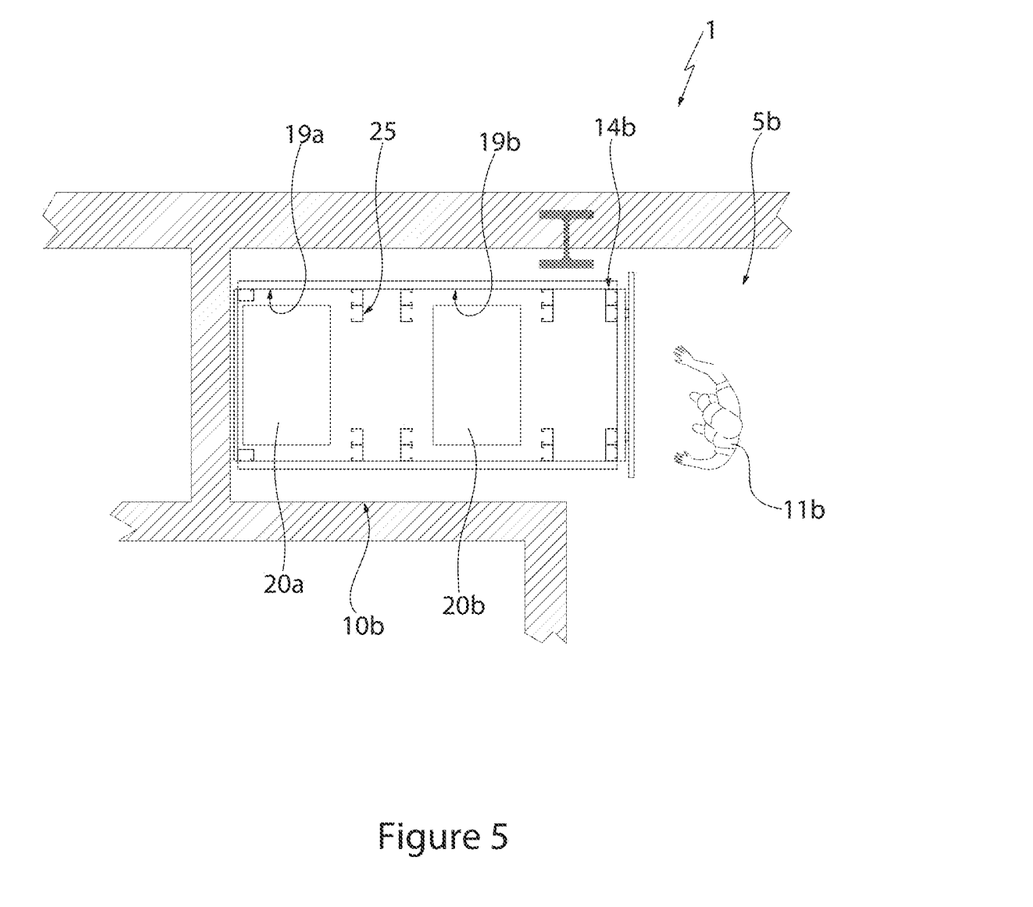
FIG. 5 is a plan view of a storage level that is visible in the detail of FIG. 2.

Furthermore, each storage column 14a,14b,14c,26 can be replaced by a plurality of columns (for example by a pair of columns) arranged alongside one another, in case there is a greater space in plan view compared to the one shown in FIG. 5. In a corresponding manner, the module 10d of the variant of FIG. 6 can have two pick-up/deposit stations 12d arranged in positions horizontally alongside one another. In this variant, the device 21a,21b,21c,21d is properly provided with a transverse lateral movement on the lift 20a,20b,20c, 20d so that it can be placed in front of the storage column 14a,14b,14c,26 and/or the pick-up/deposit station 12a,12b, 12c,12d where to carry out the pick-up/release operations to retrieve and/or release the loading unit 6.

Furthermore, the exchange station (30,31) could be arranged at a storey or level that is dedicated to product exchange operations between adjacent modules, namely where there is no storage column and/or pick-up/deposit station.

Moreover, the storage columns 14a and/or 14b and/or 14b could be part of one single column, which extends with continuity along different levels 5a,5b,5c through the floors 4.

In addition, in the storage modules 10a,10b,10c, the pick-up/deposit stations 12a,12b,12c could be arranged in positions adjacent to the storage columns 14a,14b,14c instead of being integrated inside them (in this case, a further transfer system could be necessary in order to move the loading units 6 from and to the pick-up/deposit stations).

Finally, the warehouse 1 could have a number of modules larger than three, and/or each storage module 10a,10b,10c could be arranged in the area of one single storey or level (namely, on one single floor 4), instead of comprising, each, a plurality of storeys like in the embodiments shown in the accompanying figures.

The invention claimed is:

1. An automated multi-storey warehouse to store a plurality of loading units defined by respective trays; the warehouse comprising a first module and at least a second module, each of which comprises:
    at least one respective pick-up/deposit station designed to receive any one of the trays so as to allow an operator to pick-up products from said tray and/or deposit products onto said tray;
    a respective transfer lift assembly comprising:
        a) a lift shaft,
        b) a lift movable in the lift shaft, and
        c) a pick-up/deposit device, which is carried by the corresponding lift and is configured so as to be able to horizontally translate at least one tray from and towards the corresponding lift;
wherein said second module comprises at least one respective storage column in order to define a storage module, said storage column having a plurality of places configured to house respective trays and being arranged in a position directly alongside the lift shaft of the second module to allow the pick-up/deposit device carried by the lift of the second module to horizontally transfer the trays with respect to said storage places;
wherein the pick-up/deposit station of the first module is arranged at a first level;
wherein the storage column of the second module is arranged at a second level distinct from said first level and is arranged completely above or below said first level; and
wherein the warehouse further comprises at least one exchange station, which has at least one fixed exchange place for the temporary depositing of a tray; and
wherein the lift shaft of the first module and the lift shaft of the second module are arranged on opposite sides of said fixed exchange place, so that said fixed exchange place is accessible by both the pick-up/deposit device carried by the lift of the first module and the pick-up/deposit device carried by the lift of the second module.

2. The warehouse according to claim 1, wherein said exchange station is arranged in said second level; and wherein the lift shaft of the first module extends vertically in the second level.

3. The warehouse according to claim 1, wherein the second module comprises an additional storage column, which is distinct from said storage column, has a plurality of places to accommodate respective trays and is arranged in a position directly alongside the lift shaft of said second module.

4. The warehouse according to claim 3, wherein the storage column and the additional storage column of the second module are arranged in positions diametrically opposite with respect to the lift shaft of the second module.

5. The warehouse according to claim 1, wherein the second module comprises a plurality of storage levels, which are superimposed one over the other and are completely arranged over the first level, and wherein the second module comprises a plurality of storage columns, which are arranged in positions directly alongside the lift shaft of the second module and respectively engage said storage levels.

6. The warehouse according to claim 5, wherein the storage columns of the second module are vertically aligned with each other.

7. The warehouse according to claim 1, wherein the first module comprises at least one respective storage column so as to define a further storage module, the storage column and the lift shaft of the first module being arranged in positions directly alongside each other.

8. The warehouse according to claim 1, wherein the first module is without storage columns.

9. An automated multi-storey warehouse, to store a plurality of loading units defined by respective trays; the warehouse comprising a first module and at least a second module, each of which comprises:
    at least one respective pick-up/deposit station designed to receive any one of the trays so as to allow an operator to pick-up products from said tray and/or deposit products onto said tray;
    a respective transfer lift assembly comprising:
        a) a lift shaft,
        b) a lift movable in the lift shaft, and
        c) a pick-up/deposit device, which is carried by the corresponding lift and is configured so as to be able to horizontally translate at least one tray from and towards the corresponding lift;
wherein said second module comprises at least one respective storage column in order to define a storage module, said storage column having a plurality of places configured to house respective trays and being arranged in a position directly alongside the lift shaft of the second module to allow the pick-up/deposit device carried by the lift of the second module to horizontally transfer the trays with respect to said storage places;

wherein the pick-up/deposit station of the first module is arranged at a first level;

wherein the storage column of the second module is arranged at a second level distinct from said first level and is arranged completely above or below said first level;

wherein the warehouse further comprises at least one exchange station, which has at least one exchange place for the temporary depositing of a tray and is accessible by both the pick-up/deposit device carried by the lift of the first module and the pick-up/deposit device carried by the lift of the second module; and wherein the pick-up/deposit station of said second module is integrated in said storage column.

10. An automated multi-storey to store a plurality of loading units defined by respective trays; the warehouse comprising a first module and at least a second module, each of which comprises:

at least one respective pick-up/deposit station designed to receive any one of the trays so as to allow an operator to pick-up products from said tray and/or deposit products onto said tray;

a respective transfer lift assembly comprising:
 a) a lift shaft,
 b) a lift movable in the lift shaft, and
 c) a pick-up/deposit device, which is carried by the corresponding lift and is configured so as to be able to horizontally translate at least one tray from and towards the corresponding lift;

wherein said second module comprises at least one respective storage column in order to define a storage module, said storage column having a plurality of places configured to house respective trays and being arranged in a position directly alongside the lift shaft of the second module to allow the pick-up/deposit device carried by the lift of the second module to horizontally transfer the trays with respect to said storage places;

wherein the pick-up/deposit station of the first module is arranged at a first level;

wherein the storage column of the second module is arranged at a second level distinct from said first level and is arranged completely above or below said first level;

wherein the warehouse further comprises at least one exchange station, which has at least one exchange place for the temporary depositing of a tray and is accessible by both the pick-up/deposit device carried by the lift of the first module and the pick-up/deposit device carried by the lift of the second module;

wherein the second module comprises an additional storage column, which is distinct from said storage column, has a plurality of places to accommodate respective trays and is arranged in a position directly alongside the lift shaft of said second module; and, wherein the exchange station is integrated in said additional storage column.

\* \* \* \* \*